United States Patent
Spertus et al.

(10) Patent No.: US 8,938,808 B1
(45) Date of Patent: Jan. 20, 2015

(54) SYSTEMS AND METHODS FOR USING VIRTUALIZATION TO IMPLEMENT INFORMATION RIGHTS MANAGEMENT

(75) Inventors: Michael Spertus, Wilmette, IL (US); Denis Serenyi, Arlington, VA (US); Brian Witten, Hermosa Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1034 days.

(21) Appl. No.: 12/715,213

(22) Filed: Mar. 1, 2010

(51) Int. Cl.
*G06F 7/04* (2006.01)
*G06F 17/30* (2006.01)
*G06F 21/53* (2013.01)
*H04L 29/06* (2006.01)

(52) U.S. Cl.
CPC ................ *G06F 21/53* (2013.01); *H04L 63/10* (2013.01); *H04L 2463/101* (2013.01)
USPC .................................... 726/27; 726/1; 705/51

(58) Field of Classification Search
CPC ... G06F 21/53; H04L 63/10; H04L 2463/101; H04L 2209/603
USPC .................. 713/188; 726/2, 26–30, 1; 705/51
See application file for complete search history.

(56) References Cited

U.S. PATENT DOCUMENTS

| | | | |
|---|---|---|---|
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,546,631 B1 * | 6/2009 | Moogala et al. | 726/2 |
| 7,549,164 B2 | 6/2009 | Cook et al. | |
| 7,613,930 B2 * | 11/2009 | Dotan | 713/188 |
| 7,620,956 B2 | 11/2009 | Cook et al. | |
| 7,694,328 B2 * | 4/2010 | Joshi et al. | 726/2 |
| 7,725,737 B2 * | 5/2010 | Konanka et al. | 713/190 |
| 7,877,413 B1 | 1/2011 | Cook et al. | |
| 7,886,291 B1 | 2/2011 | Jones et al. | |
| 7,890,530 B2 * | 2/2011 | Bilger et al. | 707/781 |
| 7,945,897 B1 | 5/2011 | Cook | |
| 7,970,789 B1 | 6/2011 | Blaser et al. | |
| 8,010,961 B1 | 8/2011 | Cook et al. | |
| 8,060,940 B2 | 11/2011 | McCorkendale et al. | |

(Continued)

OTHER PUBLICATIONS

Jared Blaser; Process Tracking Application Layered System; U.S. Appl. No. 11/324,571, filed Jan. 3, 2006.

(Continued)

*Primary Examiner* — Saleh Najjar
*Assistant Examiner* — Feliciano Mejia
(74) *Attorney, Agent, or Firm* — ALG Intellectual Property, LLC

(57) ABSTRACT

A method for using virtualization to implement information rights management. The method may include: 1) intercepting, at a virtualization module, a request from an application to access data; 2) querying an information-rights-management database for a virtualization policy associated with the access request; 3) receiving, at the virtualization module, the virtualization policy from the information-rights-management database; and 4) controlling access to the data by applying the virtualization policy to the access request in a manner that is transparent to the application. Various other methods, systems, and computer-readable media are also disclosed.

20 Claims, 9 Drawing Sheets

(56) References Cited

U.S. PATENT DOCUMENTS

| | | | |
|---|---|---|---|
| 8,108,346 | B1 | 1/2012 | Hurren et al. |
| 8,112,392 | B1 | 2/2012 | Bunnell et al. |
| 8,112,767 | B1 | 2/2012 | Cook |
| 8,117,314 | B2 * | 2/2012 | Croft et al. ............ 709/227 |
| 8,225,061 | B2 * | 7/2012 | Greenebaum ........... 711/163 |
| 2007/0180450 | A1 | 8/2007 | Croft et al. |
| 2011/0061045 | A1 | 3/2011 | Phillips |

OTHER PUBLICATIONS

Randall Cook; Dynamic Insertion and Removal of Virtual Software Sub-Layers; U.S. Appl. No. 12/058,782, filed Mar. 31, 2008.

Jordan Sanderson; Methods and Systems for Activating and Deactivating Virtualization Layers; U.S. Appl. No. 12/414,170, filed Mar. 30, 2009.

Karl Bunnell et al.; Methods and Systems for Merging Virtualization Sublayers; U.S. Appl. No. 12/396,969, filed Mar. 3, 2009.

Lance TeNgaio; Distributed Application Virtualization; U.S. Appl. No. 12/142,549, filed Jun. 19, 2008.

Jeremy Hurren; Feature Based Software Virtualization; U.S. Appl. No. 11/960,706, filed Dec. 20, 2007.

Karl Bunnell et al.; Methods and Systems for Creating and Applying Patches for Virtualized Applications; U.S. Appl. No. 12/369,512, filed Feb. 11, 2009.

Randall Cook; Automatic Virtualization Based on User-Defined Criteria; U.S. Appl. No. 12/024,079, filed Jan. 31, 2008.

Cynthia Bringhurst; Systems and Methods for Virtualizing Software Associated with External Computer Hardware Devices; U.S. Appl. No. 12/554,413, filed Sep. 4, 2009.

Hariharan Kolam; Applications and Enhancements of Featherweight Virtual Machine (FVM); http://www.ecsl.cs.sunysb.edu/tr/fvmThesis.pdf, as accessed on Feb. 8, 2010.

* cited by examiner

SYSTEMS AND METHODS FOR USING VIRTUALIZATION TO IMPLEMENT INFORMATION RIGHTS MANAGEMENT

BACKGROUND

Organizations that rely extensively on computer systems in carrying out their business need to have control over their internal information. In addition to malware threats, organizations may need to protect their information from accidental and intentional employee mishandling. A leak of intellectual property, financial data, or employee email can potentially harm an organization. As a result, some organizations have implemented information-rights-management systems to protect their digital information.

Many current information-rights-management systems may protect data by embedding themselves within the applications used to create, edit, or view information. Information-rights-management system providers, consequentially, may tailor their software to support each individual application and each operating system used by their clients. In such systems, content may be encrypted in a file system. When a user opens protected content from within an application, the application may call into the information-rights-management system's plug-in to interpret the policy associated with that content. The application may cooperate with the plug-in to enforce the policy.

There are numerous drawbacks to this approach that have slowed the widespread adoption of information-rights-management systems. One significant problem with traditional information-rights-management systems is that many common applications may not support rich plug-in architectures that are needed to support information rights management. For those applications capable of supporting information rights management, system administrators may need to acquire, install, and maintain plug-ins for each supported application. Unfortunately, even if applications are capable of supporting information-rights-management plug-ins, enforcing an information-rights-management policy within a user-level application plug-in may expose an information-rights-management system to a wide range of attacks. Furthermore, application behavior may be altered by the plug-in in undesirable ways, and the user interface of the information-rights-management system may be different within different supported applications. Thus, the cost and difficulty of administering such plug-ins across an enterprise application base may be prohibitively cumbersome. What is needed, therefore, is a more efficient and effective mechanism for providing information rights management.

SUMMARY

As will be described in greater detail below, the instant disclosure generally relates to systems and methods for using virtualization to implement information rights management. For example, a computer-implemented method for using virtualization to implement information rights management may include: 1) intercepting, at a virtualization module, a request from an application to access data; 2) querying an information-rights-management database for a virtualization policy associated with the access request; 3) receiving, at the virtualization module, the virtualization policy from the information-rights-management database; and 4) controlling access to the data by applying the virtualization policy to the access request in a manner that is transparent to the application.

In some embodiments, controlling access to the data may include virtualizing an operating system resource associated with the access request. In such embodiments, an operating system may provide a first view of the operating system resource, and the operating system resource may be virtualized by providing a second view of the operating system resource to the application.

In some embodiments, virtualizing the operating system resource may include decrypting the data to provide decrypted data, storing the decrypted data in a secure location, and redirecting the access request to the secure location to allow the application to access the decrypted data. Additionally or alternatively, the virtualization policy may indicate that the data is read-only for the application, the virtualization module may create a virtualized copy of the data, and the access request is handled by redirecting writes to the data from the application to the virtualized copy of the data.

In some embodiments, the access request may include a write attempt and the virtualization module may encrypt the write attempt. According to various embodiments, querying the information-rights-management database for the virtualization policy associated with the access request may include querying a remote information-rights-management system for the virtualization policy associated with the access request. In certain embodiments, the method may be tangibly embodied as computer-executable instructions on at least one computer-readable-storage medium.

According to some embodiments, a computer-implemented method for using virtualization to implement information rights management may include: 1) receiving, from a virtualization module, a request for a virtualization policy associated with a first data access request of a first application; 2) identifying the virtualization policy by searching for one or more policies associated with data identified in the first data access request; and 3) sending the virtualization policy to the virtualization module, the virtualization policy indicating whether the virtualization module should implement operating-system-level virtualization to handle the first data access request.

In various embodiments, the virtualization policy may include an application-specific rule that indicates how data access requests from the first application are handled and a data-specific rule that indicates access rights for the data identified in the first data access request. In some embodiments, the virtualization module may control access to the data by decrypting the data to provide decrypted data, storing the decrypted data in a secure location, redirecting the first access request to the secure location to allow the first application to access the decrypted data, and redirecting a second access request from a second application to the secure location to allow the second application to access the decrypted data.

According to certain embodiments, the virtualization module may include an application virtualization file system filter. Additionally or alternatively, the virtualization module may include an object manager programmed to implement operating-system-level virtualization by modifying a name of a data object identified in the data access request.

In various embodiments, a system for using virtualization to implement information rights management may include a virtualization module programmed to: 1) intercept a request from an application to access data; 2) request a virtualization policy associated with the access request; 3) receive the virtualization policy, wherein the virtualization policy indicates whether the virtualization module should implement operating-system-level virtualization to handle the first data access request; and 4) control access to the data by applying the virtualization policy to the access request in a manner that is transparent to the application. The system may also include an information-rights-management module programmed to 1) receive the request for the virtualization policy; 2) identify the virtualization policy by searching for one or more policies associated with the data; and 3) send the virtualization policy to the virtualization module.

In some embodiments, the virtualization module may be programmed to control access to the data by performing at least one of implementing operating-system level virtualization by virtualizing an operating system resource associated with the access request, blocking access to the data, and/or allowing access to the data. Additionally or alternatively, the virtualization system may be programmed to control access to the data by decrypting the data to provide decrypted data, storing the decrypted data in a secure location, and redirecting the access request to the secure location to allow the application to access the decrypted data.

According to various embodiments, the virtualization policy may indicate that the data is read-only for the application. In such embodiments, the virtualization system may be programmed to control access to the data by storing a copy of the data in a virtualization layer and redirecting writes to the data from the application to the virtualization layer so that changes are written to the copy of the data.

In certain embodiments, the virtualization module may be programmed to control access to the data by modifying a name of a data object identified in the request to access the data. According to at least one embodiment, the virtualization module may be located on a client in an enterprise and the information-rights-management module may be located on an information-rights-management server of the enterprise. In some embodiments, the virtualization module may be further programmed to virtualize an instancing resource of the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
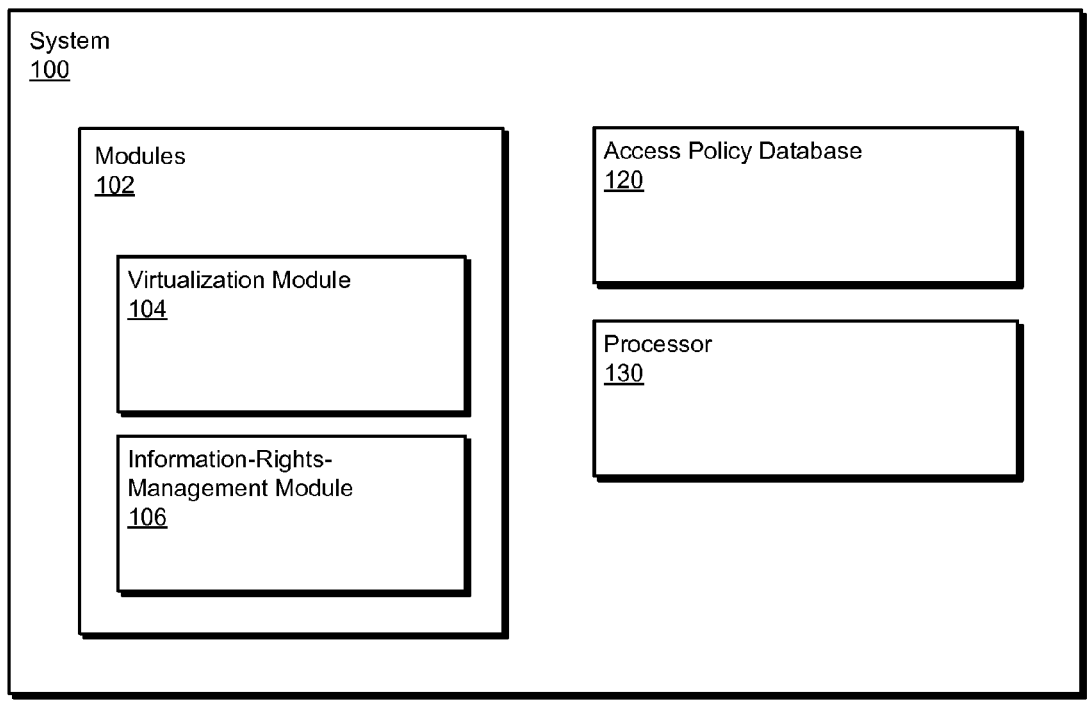
FIG. 1 is a block diagram of an exemplary system for using virtualization to implement information rights management.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using virtualization to implement information rights management. For example, a virtualization system may intercept an application's requests to access data. The virtualization system may query an information-rights-management system for virtualization polices associated with the access requests. The information-rights-management system may send virtualization policies to the virtualization system. The virtualization policies may indicate whether to block access to data, allow access to the data, and/or implement operating-system-level virtualization to handle the data access requests. By leveraging operating-system-level virtualization technologies in this manner, embodiments of the instant disclosure may facilitate application-agnostic information rights management that is secure, user-friendly, and/or provides various other advantages.

Figure 2:
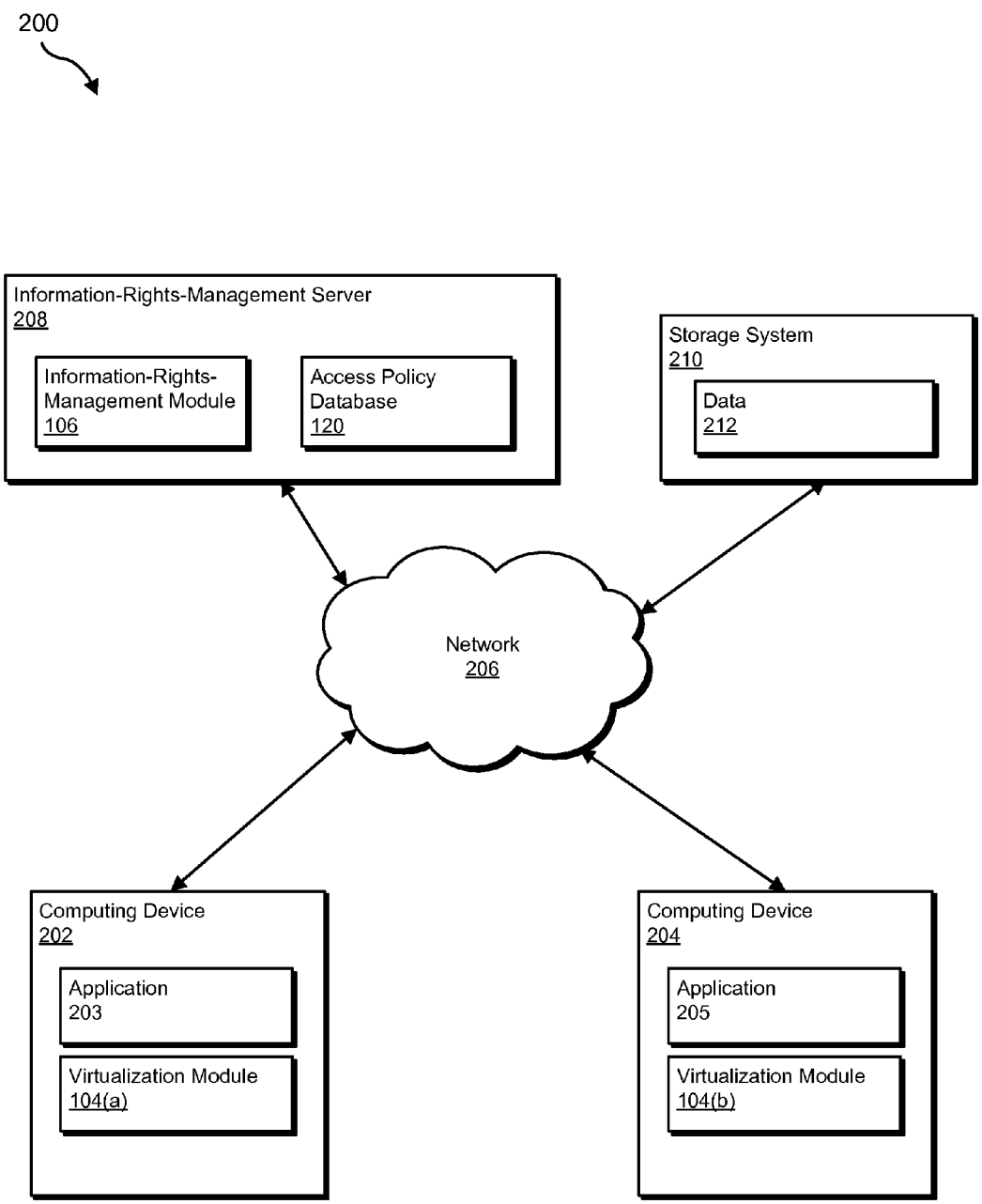
FIG. 2 is a block diagram of another exemplary system for using virtualization to implement information rights management.

The following will provide, with reference to FIGS. 1-2, detailed descriptions of exemplary systems for using virtualization to implement information rights management. Detailed descriptions of corresponding computer-implemented methods will also be provided in connection with FIG. 3-4. Detailed descriptions of exemplary operating-system level virtualization technologies are presented in the discussion corresponding to FIGS. 5-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for using virtualization to implement information rights management. As illustrated in this figure, exemplary system 100 may include one or more modules 102 for performing one or more tasks. For example, and as will be explained in greater detail below, exemplary system 100 may include a virtualization module 104 programmed to intercept a request from an application to access data and request a virtualization policy associated with the data. Virtualization module 104 may also be programmed to receive the virtualization policy and control access to the data by applying the virtualization policy to the access request in a manner that is transparent to the application. Virtualization module 104 may be programmed to implement any suitable operating-system-level virtualization technology, such as application virtualization (i.e., redirecting I/O to a virtualization layer) and namespace virtualization (i.e., renaming a data object at an operating-system call interface).

Exemplary system 100 may also include an information-rights-management module 106 programmed to receive the request for the virtualization policy associated with the data, identify the virtualization policy by searching for one or more rules associated with the data, and send the virtualization policy to the virtualization module. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202, computing device 204, and/or information-rights-management server 208), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include an access policy database 120 for storing one or more virtualization policies and/or one or more other data access rules. Access policy database 120 may represent portions of a single database or computing device or a plurality of databases or computing devices. For example, access policy database 120 may represent a portion of information-rights-management server 208 in FIG. 2, computing system 810 in FIG. 8, and/or portions of exemplary network architecture 900 in FIG. 9. Alternatively, access policy database 120 in FIG. 1 may represent one or more physically separate devices capable of being accessed by a computing device, such as information-rights-management server 208 in FIG. 2, computing system 810 in FIG. 8, and/or portions of exemplary network architecture 900 in FIG. 9.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include computing devices 202 and 204 in communication with an information-rights-management server 208 and a storage system 210 via a network 206. Computing device 202 may include an application 203 and a virtualization module 104(a), and computing device 204 may include an application 205 and a virtualization module 104(b). Computing devices 202 and 204 generally represents any type or form of computing device capable of reading computer-executable instructions. Examples of computing devices 202 and 204 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

As shown, information-rights-management server 208 may include information-rights-management module 106 and access policy database 120. Information-rights-management server 208 generally represents any type or form of computing device that is capable of providing information rights management to one or more client devices. Examples of information-rights-management server 208 include, without limitation, application servers and database servers configured to provide various database services and/or run certain software applications.

Storage system 210 may include data 212. Storage system 210 generally represents one or more storage devices configured to store any type of data. For example, storage system 210 may be a data store of an enterprise. Storage system 210 may represent a portion computing system 810 in FIG. 8, and/or portions of exemplary network architecture 900 in FIG. 9. Alternatively, storage system 210 may represent one or more physically separate devices capable of being accessed by a computing device, such as computing system 810 in FIG. 8 and/or portions of exemplary network architecture 900 in FIG. 9.

As noted, computing device 202, computing device 204, information-rights-management server 208, and/or storage system 210 may communicate over a network 206. Network 206 generally represents any medium or architecture capable of facilitating communication or data transfer. Examples of network 206 include, without limitation, an intranet, a wide area network, a local area network, a personal area network, the Internet, power line communications, a cellular network (e.g., a GSM Network), exemplary network architecture 900 in FIG. 9, or the like. Network 206 may facilitate communication or data transfer using wireless or wired connections.

In some embodiments, system 200 may represent an enterprise environment with information-rights-management server 208 managing access to data 212 stored on storage system 212. As discussed in greater detail in the description of FIG. 3, virtualization modules 104(a) and 104(b) on computing devices 202 and 204 may communicate with information-rights-management server 208 to control access to data 212.

Figure 3:
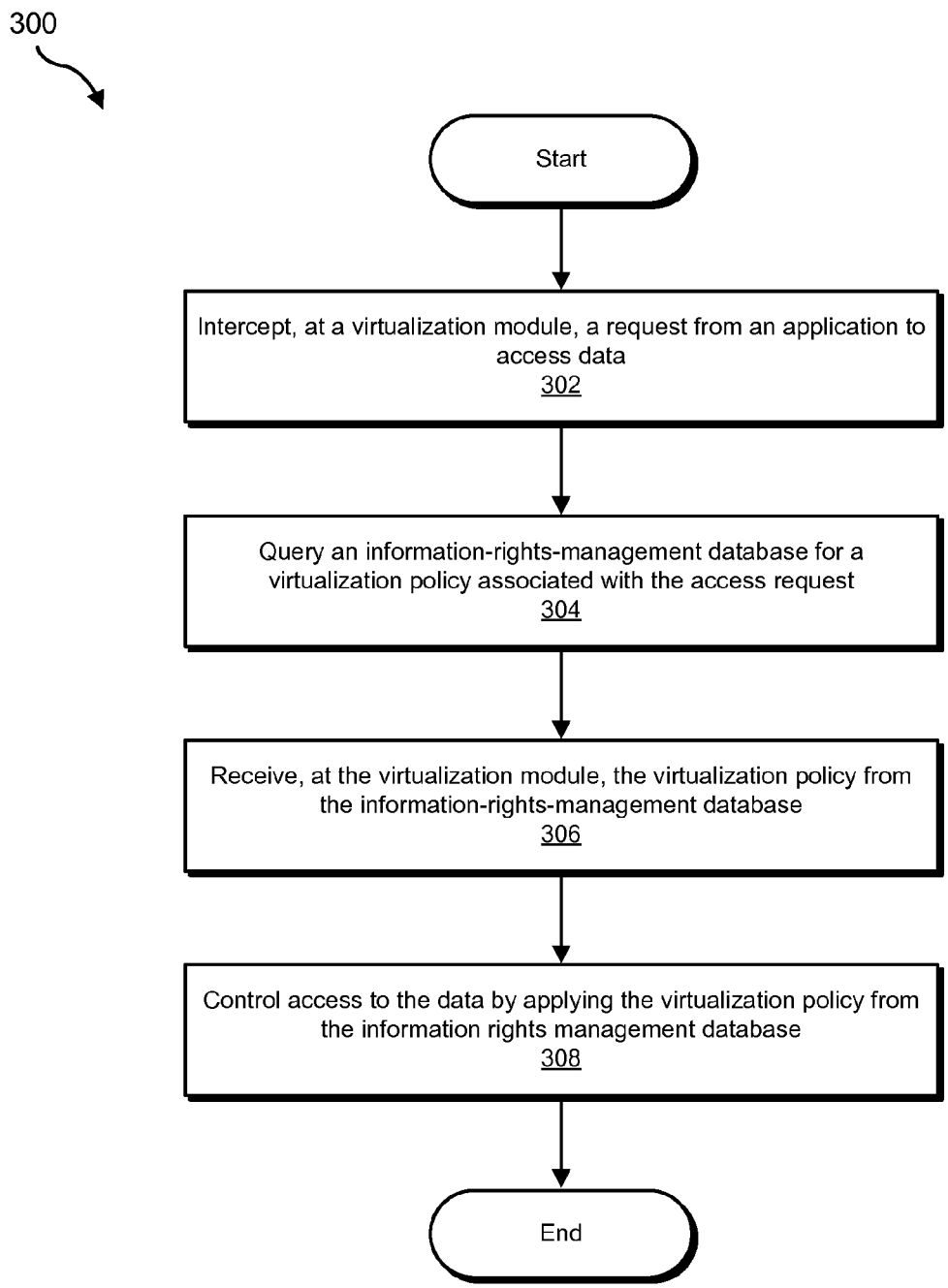
FIG. 3 is a flow diagram of an exemplary method for using virtualization to implement information rights management.

FIG. 3 is a flow diagram of an exemplary computer-implemented method 300 for using virtualization to implement information rights management. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may intercept a request from an application to access data. For example, virtualization module 104(a) may intercept a request from application 203 to access data 212 on storage system 210. Virtualization module 104(a) may intercept the request to access data in a variety of ways and/or in a variety of contexts. For example, virtualization module 104(a) may include a file system filter driver and/or object manager that intercepts and manages Input/Output ("I/O") requests from application 203. Virtualization module 104(a) may also intercept data access requests from application 203 in any other suitable manner.

In certain embodiments, virtualization module 104(a) may only intercept access requests of application 203 for data external to a process of application 203. In other words, virtualization module 104(a) may not monitor and/or control data access for data of (i.e., internal to) a process of application 104(a).

Application 203 generally represents any type or form of software that includes computer-executable instructions. For example, application 203 may include a word processor, a spreadsheet application, a document viewer, an image viewer and/or editor, an audio player and/or editor, a database application, a software development application, an email client, and/or any other type of software application that may be installed on a computing device. Similarly, data 212 generally represents any type or form of data accessible by application 203. Data 212 may, in some embodiments, include one or more files, database entries, web pages, and/or any other data object or data entity.

Virtualization module 104(a) made intercept various types of requests to access data. For example, virtualization module 104(a) may intercept requests to read data, requests to write data, requests to delete data, requests to modify data, requests to copy data, requests to move data, requests to open data (e.g., requests to launch web pages), and/or any other type of request to access data.

At step 304 in FIG. 3, one or more of the systems described herein may query an information-rights-management database for a virtualization policy associated with the access attempt. A virtualization module may query an information-rights-management database for a virtualization policy associated with the access request in any suitable manner. For example, virtualization module 104(a) may query information-rights-management module 106 for a virtualization policy associated with data 212. In such embodiments, information-rights-management module 106 may then search access policy database 120 for one or more virtualization policies associated with data 212. Alternatively, virtualization module 104(a) may be programmed to directly interface with access policy database 120, without communicating with information-rights-management module 106. In some embodiments, all or a portion of access policy database 120 may be stored locally on computing device 202 and virtualization module 104(a) may query access policy database 120 for a virtualization policy associated with data 212.

As used herein, the phrase "virtualization policy" generally refers to any type or form of rule or decision indicating how to handle a request to access data. For example, a virtualization policy may indicate that a request to access data should be blocked, allowed (e.g., permitted to continue to the target data without being modified), modified, and/or handled by implementing operating-system-level virtualization. A virtualization policy may indicate how a data access request should be handled in a variety of ways. In some embodiments, virtualization policies may indicate access control decisions made by an information-rights-management system. Alternatively, virtualization policies may include one or more rules that a virtualization module may use to make an access control decision.

As noted, virtualization policies may indicate access control decisions made by an information-rights-management system. In other words, a virtualization policy may provide a decision telling a virtualization module that a request to access data should be blocked, allowed, handled using virtualization, or otherwise modified. As an example, virtualization module 104(a) may send a virtualization-policy request for a data object to information-rights-management module 106. The virtualization-policy request may include information identifying the data object, the application attempting to access the data object, credentials of a user logged onto computing device 202, and/or any other suitable information. Information-rights-management module 106 may query access policy database 120 for access rules associated with the data object, the user, and/or the application. Information-rights-management module 106 may interpret the rules from access policy database 120 to determine how the application's attempt to access the data object should be handled. Information-rights-management module may then send a virtualization policy indicating the access control decision to virtualization module 104(a).

As an alternative to the previous example, virtualization policies may include one or more rules that a virtualization module may use to make an access control decision. For example, virtualization module 104(a) may query information-rights-management module 106 for a virtualization policy associated with a data access request. Alternatively, as previously discussed, virtualization module 104(a) may directly interface with access policy database 120 to retrieve a virtualization policy. In these examples, the virtualization policy may include one or more rules that virtualization module 104(a) may use to make an access control decision for the data access request. Virtualization module 104(a) may decide to allow the request, deny the request, and/or implement virtualization to handle the request.

As used herein, the phrase "implement operating-system-level virtualization to handle a data request" generally refers to using any virtualization process for sandboxing data associated with a request. Data access requests may be handled using an application virtualization technology, a namespace virtualization technology, and/or any other suitable operating-system-level virtualization technology. For example, virtualization module 104(a) may handle an access request for data 212 by decrypting data 212, storing the decrypted data in a secure location, and redirecting the access request to the secure location to allow application 203 to access the decrypted data. In some embodiments, virtualization module 104(a) may modify a name of a data object identified in a request to access data 212 (e.g., where data 212 comprises the data object) to sandbox the data object.

As another example of handling a data access request using virtualization, a virtualization policy may indicate that data is read-only for the application, and the virtualization module may create a copy of the data. In such embodiments, the virtualization module may redirect writes to the data from the application to the copy of the data.

A virtualization policy may include one or more application-specific rules, one or more data-specific rules, one or more user-specific rules, and/or any other suitable rules. For example, a virtualization policy may include an application-specific rule that indicates how data access requests from a particular application are handled. In this example, a virtualization policy may indicate that application 203 is only allowed to read data unless a data-specific policy specifies an exception to this default rule (e.g., the virtualization policy may include data-specific policies that indicate application 203 cannot access certain data objects, application 203 has full read-write access to certain data objects, etc.).

A virtualization policy may also indicate whether a particular user (e.g., a user of computing device 202) has the right to access data. For example, virtualization module 104(a) and/or information-rights-management module 106 may query access policy database 120 for policies associated with a particular user. The user's log-on credentials and/or other information identifying the user may be used to identify policies associated with the user.

At step 306 in FIG. 3, one or more of the systems described herein may receive the virtualization policy from the information-rights-management database. For example, virtualization module 104(a) may receive a virtualization policy associated with data 212 from access policy database 120. In some embodiments, virtualization module 104(a) may receive the virtualization policy from access policy database 120 through communication with information-rights-management module 106. Alternatively, virtualization module 104(*a*) may receive a virtualization policy directly from access policy database 120. Virtualization module 104(*a*) may also receive a virtualization policy from access policy database 120 in any other suitable manner.

At step 308 in FIG. 3, one or more of the systems described herein may control access to the data by applying the virtualization policy to the access request in a manner that is transparent to the application. For example, virtualization module 104(*a*) may control an attempt of application 203 to access data 212 by applying a virtualization policy from access policy database 120 to the access request from application 203.

Virtualization policies may be applied in a variety of ways. For example, if a virtualization policy includes an access-control decision, virtualization module 104(*a*) may apply the virtualization policy by enforcing the access-control decision. If a virtualization policy includes one or more access-control rules, virtualization module 104(*a*) may apply the virtualization policy by interpreting the access-control rules to make an access-control decision and may then apply the access-control decision.

Access rules may be interpreted in a variety of ways to make access-control decisions. In some embodiments, a virtualization policy may include a default access rule that is applied unless another rule provides an exception to the default rule. In other embodiments, virtualization module 104(*a*) may block a data-access attempt if any rule indicates that the attempt should be blocked (even if other rules indicate the attempt should be allowed). Conversely, virtualization module 104(*a*) may use virtualization to handle a data-access attempt if any rule indicates that the attempt should be allowed (even if other rules indicate that the attempt should be blocked). Virtualization module 104(*a*) may also use any other algorithm or heuristic to apply access rules to a data access attempt.

As noted, a data access attempt may be controlled in a manner that is transparent to the application making the request. As used herein, the phrase "applying a virtualization policy in a manner that is transparent to an application" generally refers to applying virtualization policies without coordination, input, and/or other interaction with the application. In some embodiments, a virtualization policy may be applied to an access request in a manner that is transparent to an application by controlling an access request with software external to the application (e.g., without having an information-rights-management plug-in installed in the application). The phrase "transparent to the application" may also refer to applying virtualization policies in a way that does not interfere with an application's operation and/or in a way that is not visible to an application.

By controlling data access in a manner that is transparent to an application, embodiments of the instant disclosure may provide various features and/or advantages over previous solutions. For example, virtualization modules disclosed herein may be application agnostic (i.e., may be used with various types of applications). Furthermore, virtualization modules disclosed herein may implement information rights management for an application's access requests without interfering with the normal operation of the application.

Virtualization module 104(*a*) may control access to data in a variety of ways and/or in various contexts. For example, if the access request is an attempt to read data, virtualization module 104(*a*) may block the attempt to read the data, may allow the attempt to read the data, or may implement virtualization to handle the attempt to read the data. In embodiments where the data is decrypted, virtualization module 104(*a*) may implement virtualization by decrypting a copy of the data, storing the data in a secure location, and redirecting the read request to the secure location. In such embodiments, virtualization module 104(*a*) may receive a decryption key from information-rights-management server 208 and/or may access a locally stored decryption key. The data may be decrypted by virtualization module 104(*a*) or by any other suitable cryptography module capable of providing the decrypted data within a sandboxed (i.e., secure) context of computing device 202.

As another example, virtualization module 104(*a*) may control access to an attempt to write data. In such embodiments, virtualization module 104(*a*) may control an attempt to write to data 212 by blocking the write attempt, by allowing the write attempt, and/or by using virtualization to handle write attempt. Virtualization module 104(*a*) may handle the write attempt by sandboxing data 212 (e.g., making a copy of data 212 in a secure location). As previously discussed, virtualization module 104(*a*) may also decrypt data 212. Virtualization module 104(*a*) may then allow the write to execute on the copy of data 212.

Figure 5:
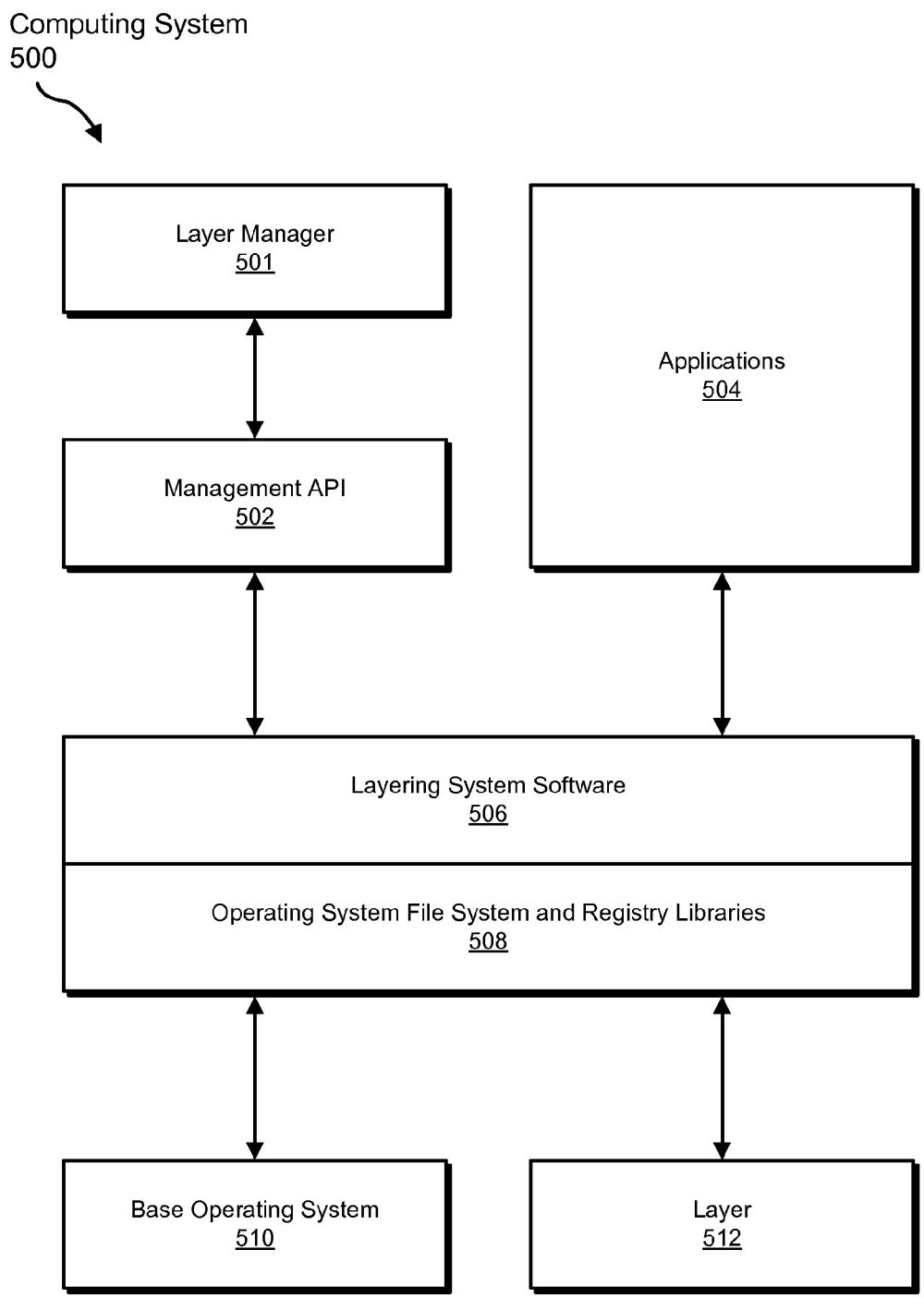
FIG. 5 is a block diagram of exemplary components of a conceptual level of a computing system configured to provide application virtualization according to certain embodiments.
Figure 6:
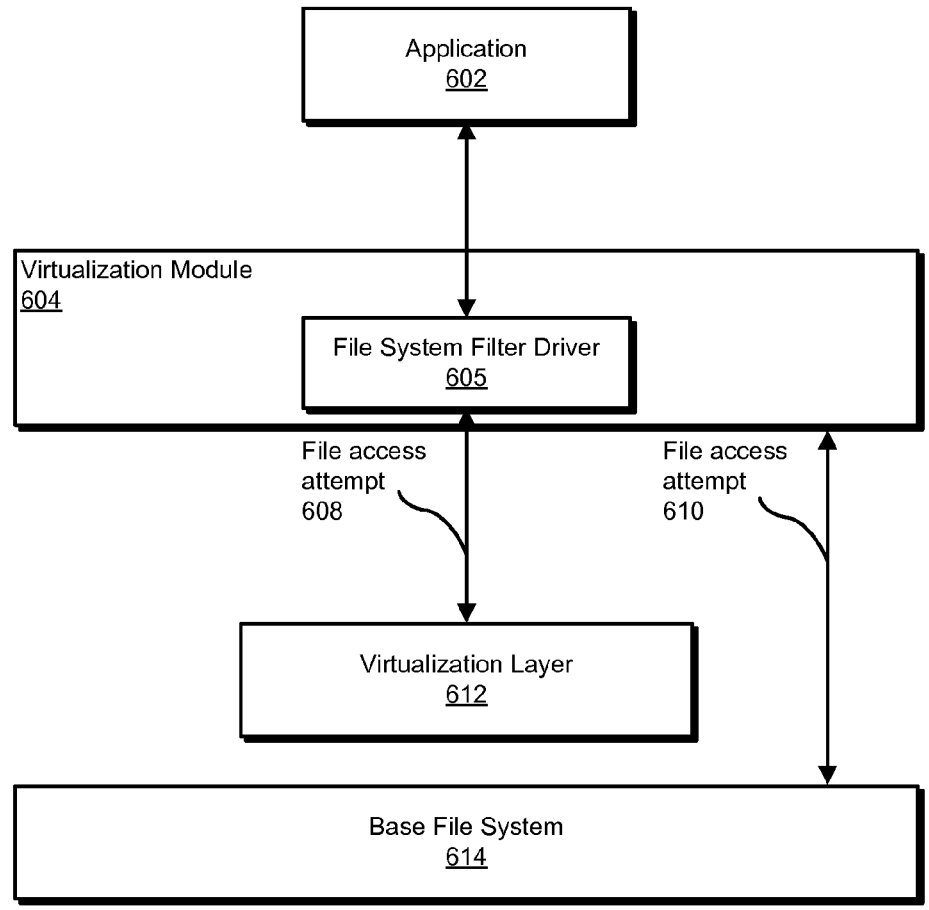
FIG. 6 is a block diagram showing data access requests performed in an application virtualization environment.
Figure 7:
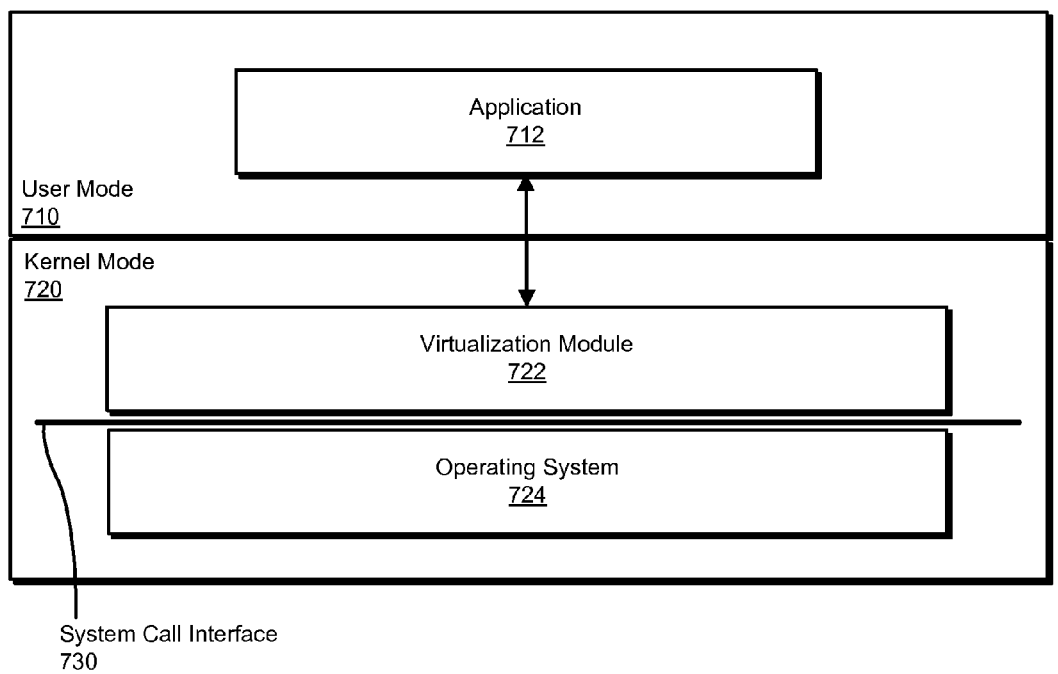
FIG. 7 is a block diagram of an exemplary system for providing namespace virtualization.

As used herein, the phrase "secure location" generally refers to a location that is sandboxed (e.g., protected) from outside access. A sandbox may include one or more controlled resources for an application. For example, a sandbox may include scratch space on disk and/or memory. In a sandbox, network access, the ability to inspect the host system, and/or the ability to communicate with input devices may not be allowed or may be restricted. Sandboxes may prevent other applications from accessing sandboxed data. Sandboxes may also provide security by controlling and/or limiting access to data in any other suitable manner. FIGS. 5-7 provide examples of how operating-system level virtualization may provide a sandbox for virtualizing data access.

While the previous examples show how data may be sandboxed for a single application, in some embodiments two or more applications may be allowed to access data within the same sandbox. For example, data access attempts from multiple applications may be redirected to the same virtualization location. Alternatively, a virtualization module may respond to data object access requests from two or more applications by mangling the data object's name in each request. For example, a copy of the data object may be renamed, and requests for the object from each application may be modified by changing the object name in the requests to the new name (i.e., the name of the copy of the data object).

According to certain embodiments, a virtualization module may control access to data by virtualizing an operating system resource associated with an access request. The virtualization module may virtualize any suitable operating system resource in any suitable way. Operating system resources include, without limitation, files, pipes, locks, registry entries, TCP/IP ports, services, running objects tables, and various other operating system components.

The virtualization module may virtualize an operating system resource (or multiple resources) by providing an application with an alternate view of the resource. In other words, an operating system may provide a first view of an operating system resource, and the virtualization module may provide a second view of the operating system resource to the application. For example, a virtualization module may virtualize a registry key of an operating system by providing an application with a modified copy of the registry key rather than the registry key maintained by the operating system.

Figure 4:
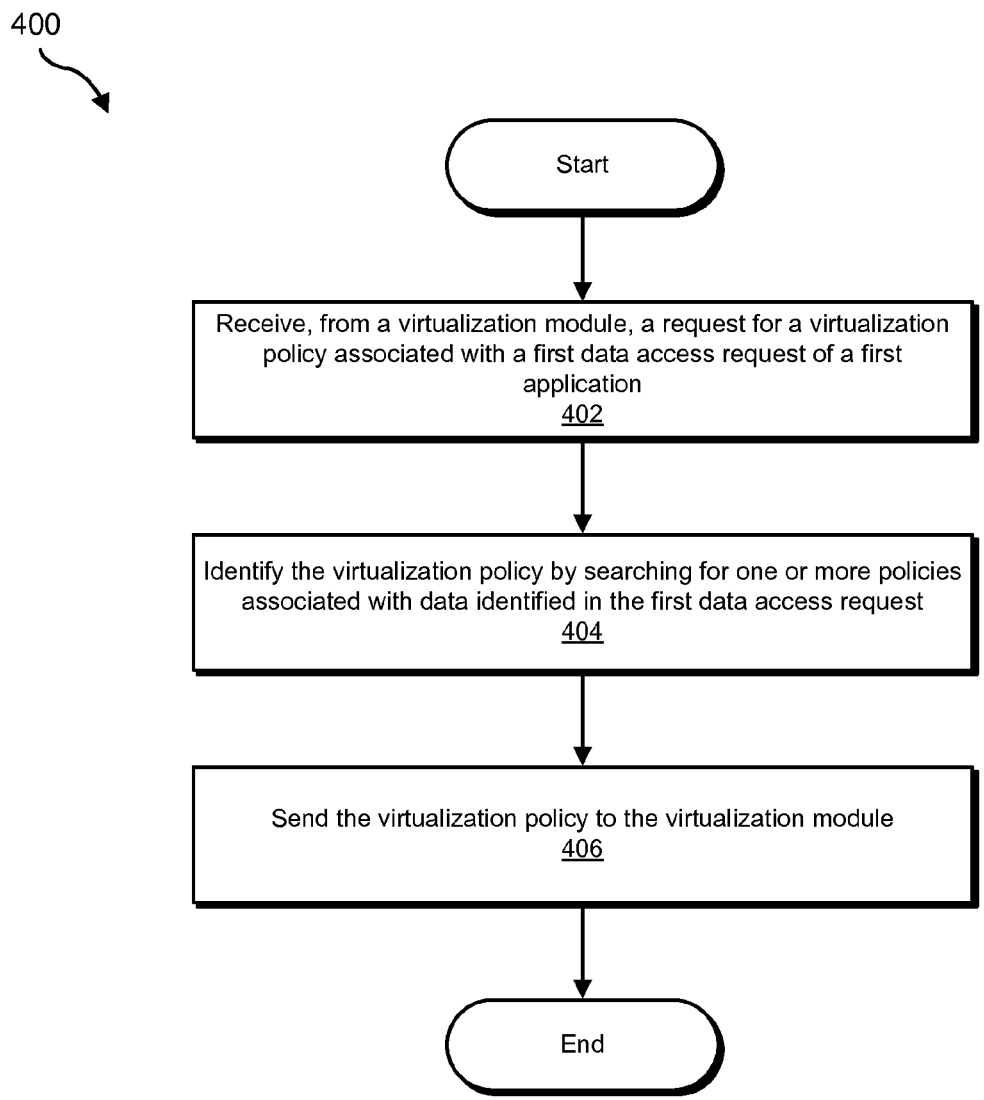
FIG. 4 is a flow diagram of another exemplary method for using virtualization to implement information rights management.

The steps shown in FIG. 3 may be steps performed by a virtualization module, such as virtualization module 104(*a*). Thus, FIG. 3 may represent a process for providing information rights management from the perspective a client machine. FIG. 4, in contrast, represents a similar process from the perspective of an application on an information-rights-management server. For example, the steps in FIG. 4 may be performed by information-rights-management module 106 on information-rights-management server 208. In other embodiments, the one or more of the steps shown in FIG. 4 may be performed on an information-rights-management client, and one or more of the steps shown in FIG. 3 may be performed on an information-rights-management server.

FIG. 4 is a flow diagram of an exemplary computer-implemented method 400 for providing information-rights-management. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

At step 402 in FIG. 4, one or more of the systems described herein may receive, from a virtualization module, a request for a virtualization policy associated with a first data access request of a first application. For example, information-rights-management module 106 may receive a request for a virtualization policy associated with an attempt to access data 212 from virtualization module 104(a). Information-rights-management module 106 may receive the request in any suitable way. For example, information-rights-management module 106 may receive the request in any of the manners described in the discussion corresponding to step 304 of FIG. 3.

At step 404 in FIG. 4, one more of the systems described herein may identify the virtualization policy by searching for one or more policies associated with data identified in the first access request. For example, information-rights management module 106 may search access policy database 120 for one or more access rules associated with data 212. Access rules may be associated with data 212 in any suitable manner. For example, access rules may be associated with data 212 in a relational database. In such embodiments, a signature (e.g., hash, fingerprint, etc.) of data 212 may be associated with an access rule. Information-rights-management module 106 may receive a signature of data 212 from virtualization module 104(a) and may use the received signature to lookup the virtualization policy associated with data 212. Information-rights-management module 106 may also receive other information (e.g., information identifying the application, information identifying a user, etc.) that may be used to look up access rules.

At step 406 in FIG. 4, or more of the systems described herein may send a virtualization policy to the virtualization module. For example, information-rights-management module 106 may send the virtualization policy to virtualization module 104(a) for use in controlling access requests from application 203 to data 212. As previously noted, the virtualization policy may include one or more access rules identified by information-rights-management module 106 and/or an access decision made by information-rights-management module 106.

If information-rights-management module 106 determines that application 203 has the right to access data 212, information-rights-management server 208 may provide virtualization module 104(a) with a decryption key for data 212 in addition to providing virtualization module 104(a) with the virtualization policy.

In some embodiments, an application may run only one process at a time for a given profile. In such embodiments, virtualization module 203 may virtualize one or more instancing resources of the application. Instancing resources may include any resources that control or are associated with instancing for an application. For example, an Internet browser may create an instancing lock file when a first instance of the browser is launched. If a user attempts to launch a second instance of the browser, the browser may determine that the instancing lock file already exists. As a result, the process for the second instance of the browser may request that the already-running process open a new browser window, and then the new process may shut down. To enable processes of such a browser (or other application) to run simultaneously in virtualized and unvirtualized contexts, virtualization module 104(a) may virtualize the instancing lock file so that multiple processes of the application can run at the same time. Virtualization module may also virtualize a named mutex object and/or any other instancing resource of an application to facilitate the information-rights-management virtualization presented herein.

FIGS. 5 and 6 illustrate examples of application virtualization. FIG. 5 shows a conceptual organization of components of a computing system 500 with a virtualization layer, which may represent an information-rights-management sandbox. A base operating system 510 may form a platform with which applications may be executed and from which files may be accessed in file systems. Base operating system 510 may include registry settings, which may be globally available to applications for reading and writing. Computing system 500 may include libraries 508 for executing the functions of the operating system. Libraries 508 may include operating system files and registry entries. Layering system software 506 may be tied to libraries 508. Layering system software 506 may interpret file system and registry accesses from applications 504. Layering system software 506, which may include virtualization module 104, may use a virtualization policy to determine whether the access should be permitted to continue to base operating system 510 or should be handled using virtualization (e.g., redirected to layer 512).

If a data access attempt is to be handled using virtualization, layer manager 501 may create a layer (e.g., layer 512) and layering system software 506 may redirect the access attempt to layer 512, which may provide a secure context in which an application can access data. Layer manager 501 may control configuration of layering system software 506 through a management Application Programming Interface (API) 502.

FIG. 6 is an exemplary block diagram of a computing system 600 showing how access requests may be redirected to a virtualization layer. Computing system 600 may include an application 602, a virtualization module 604 that includes a file system filter driver 605, a virtualization layer 612, and a base file system 614. Application 602 may make a first file access attempt 608 to access an protected, encrypted file in base file system 614. File access attempt 608 may be intercepted by file system filter driver 605. Virtualization module 604 may access a virtualization policy that indicates first file access attempt 608 should be allowed in a protected context. Virtualization module 604 may then provision virtualization layer 612 for application 602 and provide a decrypted copy of the file in virtualization layer 612. File system filter driver 605 may redirect file access attempt 608 to virtualization layer 612 to provide application 602 with access to the decrypted copy of the file.

Application 601 may make another file access attempt 610 to access an unprotected file in base file system 614. File system filter driver 605 may intercept file access attempt 610, and virtualization module 604 may access a virtualization policy that indicates file access 610 should be allowed without being modified. File system filter driver 605 may therefore allow file access attempt 610 to pass through to base file system 614. In such embodiments, the virtualization policy may be a default policy that indicates access attempts for application 601 should be allowed unless a rule indicating an access restriction exists.

Using application virtualization to provide information rights management may enable a user to edit a read-only document by providing an editable copy of the read-only document in a virtualization layer. For example, a user may direct application 602, which may be MICROSOFT EXCEL, to open a financial spreadsheet. File system filter driver 605 may intercept the attempt to open the financial spreadsheet, and virtualization module 604 may determine that the access attempt should be handled using virtualization. A read-write copy of the financial spreadsheet may be provided in virtualization layer 612 to allow a user to manipulate data in the financial spreadsheet without modifying data in the original spreadsheet in base file system 614. In such embodiments, when application 602 closes the financial document, virtualization layer 612 may be deleted and any changes made to the financial document may be deleted. Alternatively, when application 602 closes the financial document, any changes made to the financial document may be preserved. For example, when application 602 closes the document, virtualization layer 612 may be deactivated. If application 602 attempts to reopen the document, virtualization layer 612 may be activated and application 602 may be provided access to the document in virtualization layer 612.

FIG. 7 illustrates a computing system 700 that uses namespace virtualization to provide information rights management. A user mode 710 of computing system 700 may include an application 712, and a kernel mode of computing system 700 may include a virtualization module 722 and an operating system 724. As shown in system 700, virtualization module 722 may be provided on top of a system call interface 730, which may enable virtualization module 722 to see data access attempts from user-mode processes. Virtualization module 722, which may include an object manager, may provide virtualization by renaming call arguments from user-mode processes.

For example, virtualization module 722 may be programmed to mangle data access attempts from user mode processes (e.g., application 712) to provide access to alternate versions of data objects being requested. In other words, virtualization module 722 may intercept a data access attempt and rename a data object identified in the access attempt. Virtualization module 722 may implement a copy-on-access process by duplicating the data object if the data object has not already been duplicated. For example, if virtualization module 722 receives a request to write to a file that has not yet been duplicated, virtualization module 722 may duplicate a file's content, attributes, directory structure, and/or registry key. Virtualization module 722 may then modify the request to name the duplicate file (rather than the original file) and may allow the write to be executed on the duplicate file.

Figure 8:
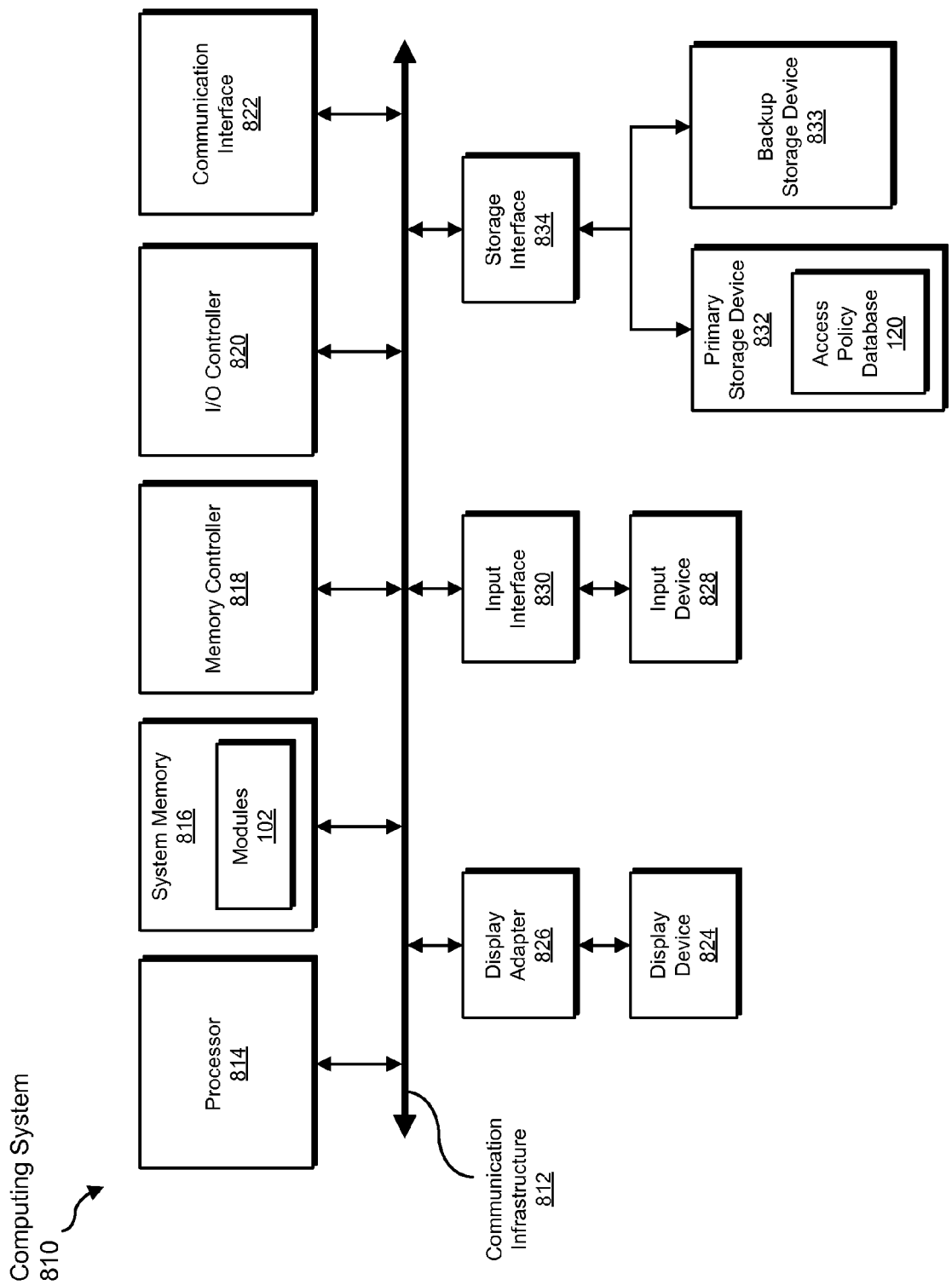
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the intercepting, querying, receiving, controlling, indicating, decrypting, storing, redirecting, identifying, sending, and/or virtualizing steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as intercepting, querying, receiving, controlling, indicating, decrypting, storing, redirecting, identifying, sending, and/or virtualizing.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the intercepting, querying, receiving, controlling, indicating, decrypting, storing, redirecting, identifying, sending, and/or virtualizing steps described herein.

I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the intercepting, querying, receiving, controlling, indicating, decrypting, storing, redirecting, identifying, sending, and/or virtualizing steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the intercepting, querying, receiving, controlling, indicating, decrypting, storing, redirecting, identifying, sending, and/or virtualizing steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, access policy database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the intercepting, querying, receiving, controlling, indicating, decrypting, storing, redirecting, identifying, sending, and/or virtualizing steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
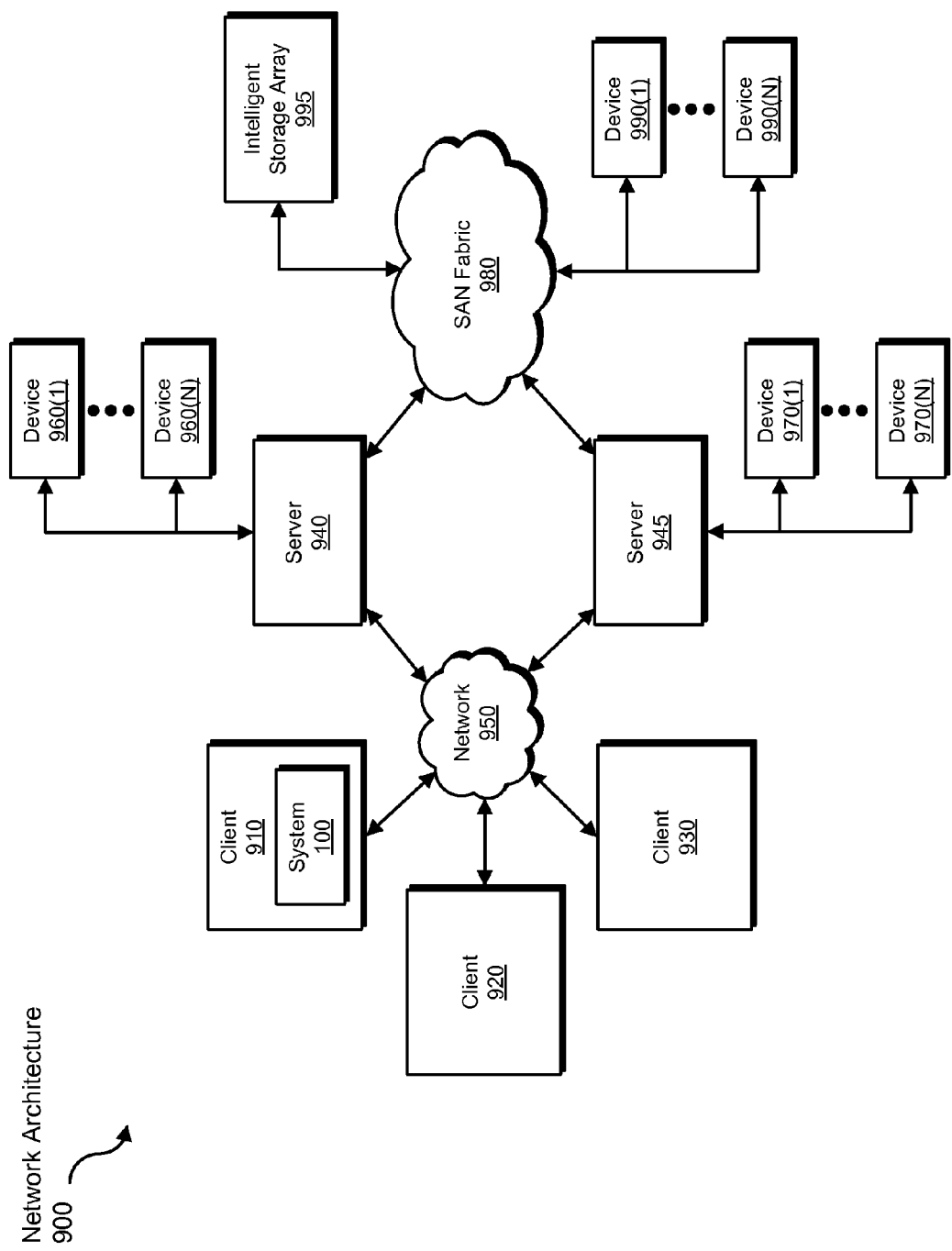
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. In one example, client system 910 may include system 100 from FIG. 1.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the intercepting, querying, receiving, controlling, indicating, decrypting, storing, redirecting, identifying, sending, and/or virtualizing steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for using virtualization to implement information rights management.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a system for providing virtualized information rights management. One or more of the modules herein may also transform attempts to access data by using virtualization to handle attempts to access data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using virtualization to implement information rights management, at least a portion of the method being performed by a computing device comprising at least one processor, the method comprising:
 intercepting, at a virtualization module on the computing device, a request from an application to access data;
 querying an information-rights-management database of an information-rights-management system for a virtualization policy associated with the access request and associated with a user who is logged onto the computing device, wherein the information-rights management system establishes the virtualization policy;
 receiving, at the virtualization module, the virtualization policy from the information-rights-management database;
 controlling access to the data by applying the virtualization policy to the access request in a manner that is transparent to the application, wherein applying the virtualization policy to the access request comprises:
  intercepting the access request at a file system filter driver;
  determining, based on the virtualization policy, that the access request is to be virtualized;
  identifying a secure virtual location to which access is limited;
  redirecting the access request to the secure virtual location.

2. The method of claim 1, wherein:
 the access request comprises a read request for encrypted data;
 applying the virtualization policy comprises decrypting the encrypted data to provide a decrypted copy of the data;
 the decrypted copy of the data is stored in the secure virtual location.

3. The method of claim 2, wherein:
 decrypting the encrypted data comprises querying the information-rights-management system for a decryption key;
 using the decryption key to decrypt the encrypted data.

4. The method of claim 2, wherein storing the decrypted copy of the data in the secure virtual location comprises provisioning a virtualization layer and providing the decrypted copy of the data in the virtualization layer.

5. The method of claim 1, wherein:
 processes that access the secure virtual location are not allowed to communicate with input devices.

6. The method of claim 1, wherein:
 data access attempts from a plurality of applications are redirected to the secure virtual location.

7. The method of claim 1, tangibly embodied as computer-executable instructions on at least one non-transitory computer-readable-storage medium.

8. A computer-implemented method for using virtualization to implement information rights management, at least a portion of the method being performed by a computing device comprising at least one processor, the method comprising:
 receiving, from a virtualization module, a request for a virtualization policy associated with a first data access request of a first application;
 establishing the virtualization policy by searching an access policy database for one or more rules associated with data identified in the first data access request, interpreting the one or more rules to make a decision regarding how the first data access request of the first application should be handled, wherein the virtualization policy indicates the result of the decision;
 sending the virtualization policy to the virtualization module, the virtualization policy indicating whether the virtualization module should implement operating-system-level virtualization to handle the first data access request, wherein the virtualization module is programmed to use the virtualization policy to control access to the data identified by the first data access request.

9. The method of claim 8, wherein the one or more rules comprise:
 an application-specific rule that indicates how data access requests from the first application are handled;
 a data-specific rule that indicates access rights for the data identified in the first data access request.

10. The method of claim 8, wherein the virtualization module is programmed to implement the operating-system-level virtualization by:
 decrypting the data identified in the first data access request to provide decrypted data;
 storing the decrypted data in a secure location;
 redirecting the first data access request to the secure location to allow the first application to access the decrypted data;
 redirecting a second data access request from a second application to the secure location to allow the second application to access the decrypted data.

11. The method of claim 8, wherein:
 the virtualization module comprises an application virtualization file system filter.

12. The method of claim 8, wherein:
 the virtualization module comprises an object manager programmed to implement the operating-system-level virtualization by modifying a name of a data object identified in the first data access request.

13. The method of claim 8, tangibly embodied as computer-executable instructions on at least one computer-readable-storage medium.

14. A system for using virtualization to implement information rights management, the system comprising:
 a virtualization module on a computing device programmed to:
  intercept a request from an application to access data;
  request a virtualization policy associated with the access request and associated with a user who is logged onto the computing device;
  receive the virtualization policy, wherein the virtualization policy indicates whether the virtualization module should implement operating-system-level virtualization to handle the access request;

control access to the data by applying the virtualization policy to the access request in a manner that is transparent to the application, wherein applying the virtualization policy to the access request comprises:
1) intercepting the access request at a file system filter driver,
2) determining, based on the virtualization policy, that the access request is to be virtualized,
3) identifying a secure virtual location to which access is limited,
4) redirecting the access request to the secure virtual location;

an information-rights-management module programmed to:
receive the request for the virtualization policy;
identify the virtualization policy by searching for one or more policies associated with the access request;
send the virtualization policy to the virtualization module;

one or more processors configured to execute the virtualization module and the information-rights-management module.

15. The system of claim 14, wherein the virtualization module is programmed to control access to the data by performing at least one of:
implementing the operating-system-level virtualization by virtualizing an operating system resource associated with the access request;
blocking access to the data;
allowing access to the data.

16. The system of claim 14, wherein the virtualization module is programmed to control access to the data by:
decrypting the data to provide decrypted data;
storing the decrypted data in the secure virtual location;
redirecting the access request to the secure virtual location to allow the application to access the decrypted data.

17. The system of claim 14, wherein:
the virtualization module is programmed to virtualize an instancing lock file for the application such that multiple processes of the application can run at the same time.

18. The system of claim 14, wherein the virtualization module is programmed to control access to the data by virtualizing a named mutex object of the application.

19. The system of claim 14, wherein:
the virtualization module is located on a client in an enterprise;
the information-rights-management module is located on an information-rights-management server of the enterprise.

20. The system of claim 14, wherein the virtualization module is further programmed to:
virtualize an instancing resource of the application.

* * * * *